United States Patent
Tschache et al.

(10) Patent No.: US 10,079,685 B2
(45) Date of Patent: Sep. 18, 2018

(54) METHOD FOR MANIPULATION PROTECTION OF A BUS SYSTEM BETWEEN AT LEAST TWO SYSTEM COMPONENTS

(71) Applicant: VOLKSWAGEN AG, Wolfsburg (DE)

(72) Inventors: Alexander Tschache, Wolfsburg (DE); Oliver Hartkopp, Wolfsburg (DE)

(73) Assignee: Volkswagen AG (DE)

( * ) Notice: Subject to any disclaimer, the term of this patent is extended or adjusted under 35 U.S.C. 154(b) by 176 days.

(21) Appl. No.: 15/189,678

(22) Filed: Jun. 22, 2016

(65) Prior Publication Data

US 2016/0373261 A1    Dec. 22, 2016

(30) Foreign Application Priority Data

Jun. 22, 2015    (DE) .................. 10 2015 211 451

(51) Int. Cl.
*H04L 29/06*    (2006.01)
*H04L 9/32*    (2006.01)
(Continued)

(52) U.S. Cl.
CPC ............ *H04L 9/3247* (2013.01); *G06F 13/36* (2013.01); *H04L 9/3226* (2013.01);
(Continued)

(58) Field of Classification Search
CPC ... H04L 9/3247; H04L 9/3226; H04L 9/3242; H04L 12/40104; H04L 63/0428;
(Continued)

(56) References Cited

U.S. PATENT DOCUMENTS 5,761,309 A * 6/1998 Ohashi ................. G06Q 20/341
                                                    713/156
6,411,712 B1 * 6/2002 Yoshida ............... H04N 7/1675
                                                    348/E5.004
(Continued)

FOREIGN PATENT DOCUMENTS

DE    102004036810 A1    3/2006
DE    102008026697 A1    12/2009
(Continued)

OTHER PUBLICATIONS

Search Report for European Patent Application No. 16172350.7; dated Nov. 11, 2016.

*Primary Examiner* — Michael S McNally
(74) *Attorney, Agent, or Firm* — Barnes & Thornburg LLP (57) ABSTRACT

A method for a manipulation protection of useful data packets to be transmitted via a bus system between at least two system components, wherein the system components include a signing and signing test unit by which data packets can be generated and tested. A first one of the system components generates an independent protective data packet with protective information for a useful data packet to be transmitted via the bus system, which protective data packet is independent of this useful data packet but, can be allocated unambiguously to it, after which the generated protective data packet is sent out separately from the associated useful data packet via the bus system to the second one of the system components and a verification of the authenticity of the useful data packet to be transmitted is effected by the transmitted protective data packet by the second one of the system components.

33 Claims, 4 Drawing Sheets

(51) Int. Cl.
*G06F 13/36* (2006.01)
*H04L 12/40* (2006.01)
*B60W 50/00* (2006.01)

(52) U.S. Cl.
CPC ...... *H04L 9/3242* (2013.01); *H04L 12/40104* (2013.01); *H04L 63/0428* (2013.01); *H04L 63/08* (2013.01); *H04L 63/083* (2013.01); *H04L 63/123* (2013.01); *B60W 2050/0045* (2013.01); *H04L 2012/40215* (2013.01); *H04L 2209/84* (2013.01)

(58) Field of Classification Search
CPC ..... H04L 63/08; H04L 63/083; H04L 63/123; G06F 13/36
USPC .......................................................... 713/176
See application file for complete search history.

(56) References Cited

U.S. PATENT DOCUMENTS

| | | | |
|---|---|---|---|
| 7,447,234 B2* | 11/2008 | Colas | ...................... H04L 29/06 370/474 |
| 2011/0208884 A1 | 8/2011 | Horihata | |
| 2013/0132730 A1* | 5/2013 | Falk | ...................... H04L 9/3236 713/181 |
| 2015/0074404 A1* | 3/2015 | Kasper | ................... H04L 63/08 713/170 |

FOREIGN PATENT DOCUMENTS

| | | |
|---|---|---|
| DE | 102009002396 A1 | 10/2010 |
| DE | 102009045133 A1 | 3/2011 |
| DE | 1020100033229 A1 | 2/2012 |
| DE | 102012210327 A1 | 12/2013 |
| DE | 102013108006 A1 | 1/2015 |

* cited by examiner

METHOD FOR MANIPULATION PROTECTION OF A BUS SYSTEM BETWEEN AT LEAST TWO SYSTEM COMPONENTS

PRIORITY CLAIM

This patent application claims priority to German Patent Application No. 10 2015 211 451.1, filed 22 Jun. 2015, the disclosure of which is incorporated herein by reference in its entirety.

SUMMARY

Illustrative embodiments relate to a method for a manipulation protection of useful data packets to be transmitted by a bus system between at least two system components, wherein the system components comprise in each case a signing and signing test unit by means of which data packets can be generated and tested for useful data packets.

BRIEF DESCRIPTION OF THE DRAWINGS

In the text which follows, the disclosed embodiments will be explained by the associated drawings, in which.

DETAILED DESCRIPTION

For some time, hacker attacks on the bus systems of motor vehicles have increasingly occurred in which arbitrary data or data packets, respectively, are fed onto the bus systems, particularly onto the CAN bus system of the motor vehicle which leads or can lead to an abnormal vehicle behavior. Such hacker attacks can result in damage to the motor vehicle or damage to components of the latter.

In the prior art, some approaches already exist, therefore, which are directed to the protection of the communication between the system components of a bus system. For example, DE 10 2009 002 396 A1 discloses a method for manipulation protection of a sensor and of sensor data of the sensor in which, as part of the authentication of the sensor data, a random number is sent from a control device to the sensor, the sensor data from the sensor to the control device being provided with cryptographic integrity protection for the detection of manipulation of the sensor data. In addition, additional time-variant parameters are added to the sensor data for the prevention of replay attacks. DE 10 2009 045 133 A1 discloses a very similar method.

Furthermore, DE 10 2004 036 810 A1 discloses a communication method for at least two system components of the bus system of a motor vehicle. In this communication method, the system components in each case keep a predetermined fixed number of test codes, known only to them, available. On the basis of a time-variable signal which is accessible to both system components, one of the test codes is selected by both system components on start of the vehicle via an allocation function, here designed as a hash function, and with this test code, the useful data to be transmitted are coded. Furthermore, various methods and standards used for the encryption of messages exist in the prior art, of which the AUTOSAR standard can be mentioned as one example of many.

However, all these methods and standards have disadvantages with regard to their security or with regard to their manageability. Thus, for example, only data packets having a predetermined limited bit length which is too short for most of the encryption methods and standards described above and known in the prior art, can be transmitted via a CAN bus system. Furthermore, the encryption methods and systems are mostly also not designed for bus systems used in motor vehicles with regard to other aspects, offer an inadequate measure of security or require extensive modification of the message to be transmitted. Hybrid bus systems such as the CAN system, the CAN-FD bus system or Ethernet are not or not sufficiently taken into consideration by most of the methods and standards mentioned.

Disclosed embodiments provide a method for a manipulation protection of useful data packets to be transmitted via a bus system between at least two system components which, compared with the prior art, is tailored better to bus systems being used in a motor vehicle, and is independent of the maximum bit length of the data packets which can be transmitted by means of these bus systems.

A method for a manipulation protection of useful data packets to be transmitted via a bus system between at least two system components is provided in which the system components comprise in each case a signing and signing test unit by means of which data packets can be generated and tested. As part of the method, a first one of the system components generates an independent protective data packet with protective information for a useful data packet to be transmitted via the bus system, which protective data packet is independent of this useful data packet but, nevertheless, can be allocated unambiguously to it. Following this, the generated protective data packet is sent out separately from the associated useful data packet via the bus system to the second one of the system components. Furthermore, a verification of the authenticity of the useful data packet being transmitted is effected by means of the transmitted protective data packet by the second one of the system components.

In such a method, a further message containing protective information, the protective data packet, is transmitted via the bus system in addition to the message to be protected, that is to say additionally to the useful data packet to be protected. The protective information of the protective data packet are generated cryptographically and can be verified by the receiving system component. By this means, the hacker attacks described above become impossible.

A data packet may comprise at least one information item on the significance of at least one bit.

Optionally, following the transmission of the protective data packet, the useful data packet to which the protective data packet can be allocated is transmitted by the first system component to the second system component. Furthermore, the useful data packet and the protective data packet which can be allocated to it are sent out at the same time.

In at least one disclosed embodiment, in the signing and signing test units of the at least two system components at least one identical cryptographic key is deposited in each case by means of which protective data packets sent out are encrypted and decrypted. In such a disclosed embodiment, the encryption and decryption of protective data packets by means of the same cryptographic key is possible in a simple but still secure manner.

Optionally, each useful data packet for which a protective data packet is generated comprises a counter having a bit length of N bits, which counter is incremented with each transmission of the respective useful data packet. The counter of a useful data packet may be increased by one with each transmission of this packet. Furthermore, the counter is reset to a starting value of zero in the case of an overflow. This contributes to a reliable protection against so-called replay attacks and provides for simple allocation of protective data packets to their respective useful data packets. Furthermore, the protective data packet which can be allocated to the useful data packet in each case also comprises the counter exhibited by the useful data packet. The method may be carried out for sending out so-called ASIL-related messages, that is to say for useful data packets which are relevant to the so-called Automotive Safety Integrity Level (ASIL). More precisely, so-called classified ASIL data packets already have the counter contained in them. This implementation of the counter in the ASIL data packet is ensured by a method anchored in AUTOSAR. The so-called AUTOSAR, that is to say the so-called AUTomotive Open System ARchitecture is a software architecture which resulted from a development partnership of automobile manufactures, control device manufactures and manufactures of development tools, basic software of control devices and microcontrollers. The Automotive Safety Integrity Level is a risk classification scheme which is defined by ISO 26262.

The counter may have a bit length of 4 bits. Such short counters are suitable, or result, respectively, especially when the bus system via which the useful data packets are sent out in accordance with the disclosed method is a CAN bus system.

In at least one disclosed embodiment, each protective data packet and each useful data packet has in each case one message identifier deciding about the allocation of the respective data packet to a priority stage, wherein the value of the message identifier of a protective data packet is selected close to the value of the message identifier of the useful data packet which can be allocated to it, in such a manner that the useful data packet and the protective data packet which can be allocated are allocated to the same or directly mutually adjacent priority stages. In other words, both a useful data packet and also the protective data packet which can be allocated to it have within the bus system the same or a closely adjacent prioritization. By this means, it is avoided that, for example, in the case of high utilization of the bus system, only one of the two data packets reaches the respective receiving system component.

Optionally, via the same bus system, useful data packets not to be verified by protective data packets are also transmitted between the at least two system components, for which no protective data packets are generated and sent out. By this means, unnecessary additional loading of the bus system can be avoided since a verification of the authenticity of a useful data packet being transmitted takes place only when this is actually needed. Optionally, the disclosed method also comprises the operation of grading and specifying the useful data packets to be transmitted via the bus system, in which operation all useful data packets which can be transmitted via the bus system are graded into functional groups in accordance with functional criteria and it is specified for each of the groups obtained in this manner whether protective data packets are generated and transmitted for the useful data packets included in the group. Optionally, the selection and specification is predetermined, or can be carried out individually by a user, in the operation of grading and specifying. With such an execution of the method, a user of the bus system can decide for which useful data packets or for which functional group of useful data packets, respectively, allocatable protective data packets are generated. A functional group can comprise, for example, all useful data packets which have information or data with respect to a route of a motor vehicle traveled system-internally.

Optionally, the at least two system components have a time unit synchronized to a common system time. In a possible alternative embodiment of the disclosed method, this provides a protection against so-called replay attacks on the bus system in a simple manner.

In at least one disclosed embodiment, the protective data packet is formed via the system time and via at least a part of the useful data of the useful data packet to be transmitted to which the protective data packet can be allocated. In such a disclosed embodiment, the protective data packet comprises the time information provided by the synchronized time unit so that the content of the protective data packet can be calibrated and verified by the receiving system component. The current system time may correspond to a time stamp.

The disclosed method may guarantee that the counter of a useful data packet is not repeated during the validity of a particular time stamp. Otherwise, protection against replay attacks would not be guaranteed. Furthermore, the incrementation frequency of the time stamp is correspondingly selected to be adapted to the transmitting frequency of the useful data packets in such a manner that the counter of a useful data packet is not repeated during the validity of a particular time stamp. If, for example, a message is sent out with 100 Hz and the counter is 4 bits long, that is to say comprises 16 values, the counter overflows every 160 milliseconds. A message is sent out every 10 ms (compare transmitting frequency of 100 Hz) so that, with 16 different values for the counter, an overflow occurs after 16 messages, that is to say every 160 ms. If then the time stamp were to be incremented by only 1 Hz clock, the message counter would be repeated several times within this time window. For this reason, the frequency of incrementation of the time stamp is selected as proposed above.

The method may also comprise the operation of carrying out a challenge-response authentication between the at least two system components, wherein a generated random number is transmitted from one of the at least two system components to the other one of the at least two system components and the response to this is used for the authentication. In such a disclosed embodiment, the protective data packet is formed, among other things, via the generated random number, that is to say via the generated challenge, and used for authentication. The protective data packet acts here as response to the challenge. Furthermore, a nonce, that is to say a number used only once, is transmitted from one of the at least two system components to the other of the at least two system components in the operation of execution of the challenge-response authentication, and the response to it is used for authentication. Furthermore, in the operation of execution of the challenge-response authentication, an arbitrary challenge is transmitted from one of the at least two system components to the other one of the at least two system components and the response to it is used for authentication. Such a challenge-response authentication meets high security standards and contributes to a secure communication, well protected against hacker attacks, between the system components of the bus system. In such a disclosed embodiment, the random number can replace the time stamp for implementing a replay protection so that a synchronized time unit can be dispensed with.

The protective data packet may be formed via the generated random number and via at least a part of the useful data of the useful data packet to be transmitted to which the protective data packet can be allocated. Furthermore, the protective data packet is formed via the nonce, that is to say via a number used only once, and via at least a part of the useful data of the useful data packet to be transmitted to which the protective data packet can be allocated. Furthermore, the protective data packet is formed via the challenge and via at least a part of the useful data of the useful data packet to be transmitted to which the protective data packet can be allocated. In this alternative embodiment of the disclosed method, the bus system is also protected against replay attacks as a result of which the security of the protected message is increased further.

In at least one disclosed embodiment, the protective data packet is also formed via the counter and via the message identifier of the useful data packet to which the protective data packet can be allocated.

Furthermore, the protective data packet is also formed via the counter and via the message identifier of the protective data packet. In such a further development of the method, it is not only the transmitted data which are secured but the channel of transmission is also verified.

Optionally, for a useful data packet to be protected, a Message Authentication Code is calculated and transmitted in the protective data packet which can be allocated to the useful data packet. The Message Authentication Code is a signature which is calculated with a common cryptographic key and transmitted verbatim. By calculating such a MAC, i.e., Message Authentication Code, an integrity protection of the data becomes possible in an efficient and secure manner. A EMAC or an OMAC may be calculated in the calculation of the Message Authentication Code, that is to say a so-called Encrypted MAC (EMAC) or a One-Key MAC (OMAC).

Furthermore, at least one identical cryptographic key is deposited in each case in the signing and signing test units of the at least two system components, which key is used for calculating a Message Authentication Code.

Optionally, useful data packets, the authenticity of which is cannot be verified by means of the protective data packet which can be allocated to them in each case, are discarded. In this manner, only useful data packets having an actual right to exist are permitted and utilized, wherein the protection against hacker attacks is precisely guaranteed.

In at least one disclosed embodiment, the Message Authentication Code has a bit length of 60 bits. This forms a significant difference with respect to the prior art. In the systems existing in the prior art, the protective data were always transmitted in the same message in which the useful data were also transported. To be able to guarantee this, the existing formats had to be regularly adapted to create the space needed for the additional protective data within the messages or useful data packets respectively. Thus, an extensive modification of the messages or useful data packets, respectively, to be transmitted was mostly necessary in the prior art whereas the disclosed method enables the transmitted messages or useful data packets, respectively, or messages or useful data packets, respectively, to be transmitted to be left either completely or at least largely untouched. For example, in the case of the exemplary embodiment described before, a new message, the protective data packet, can be simply sent out whilst the original message only requires a 4-bit counter. The original message, if it is an ASIL data packet, already has such a 4-bit counter, in any case, or it can be added to the original message with only little expenditure.

The bus system may be a CAN bus system. A CAN bus system, that is to say a Controller Area Network bus system, is a cost effective serial bus system which is rugged, easy to configure and to extend and has automatic error detection.

Optionally, the signed data can also be encrypted via an additional stream cipher. In this context, the data must first be signed and then encrypted. Furthermore, at least a part of the time stamp comprising N bits or a part of the random number/challenge comprising N bits and at least a part of a Message Authentication Code (MAC) comprising N bits is used as initialization vector of the stream cipher, wherein $N \in \mathbb{N}$. The 56-bit time stamp and the 56-bit message authentication code (MAC) of the message may be used as initialization vector of the stream cipher.

Further disclosed embodiments are obtained from the remaining features mentioned in the subclaims.

The various embodiments mentioned in the present application can be combined with one another unless stated differently in the individual case.

Figure 1:
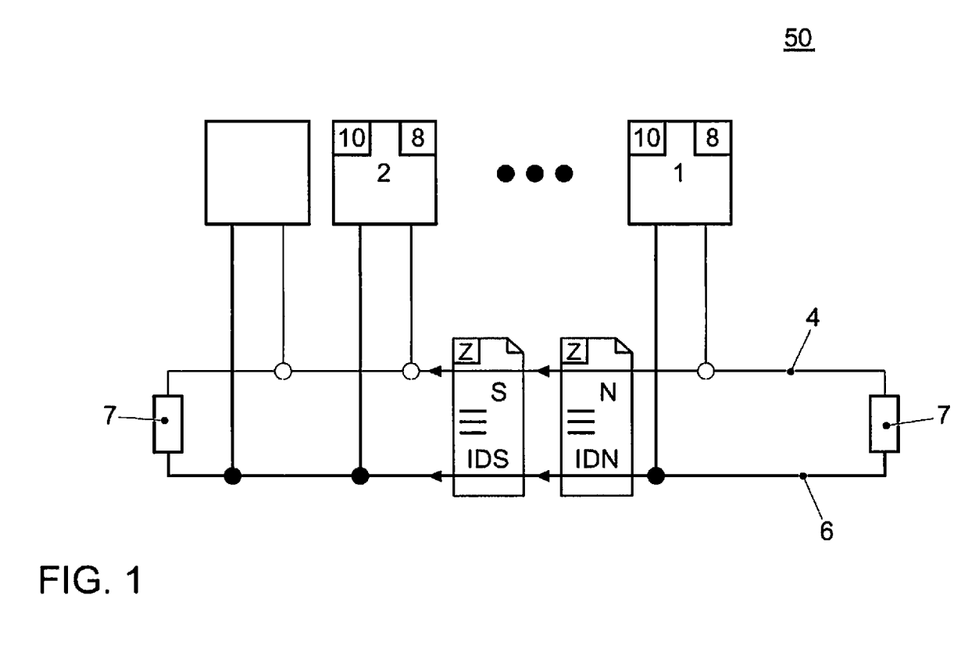
FIG. 1 shows a schematic representation of the exchange of a useful data packet N between two system components of a bus system according to a first exemplary embodiment of the disclosed method.

FIG. 1 shows a schematic representation of the exchange of a useful data packet N between two system components 1, 2 of a bus system 50 according to a first exemplary embodiment of the disclosed method. In this first exemplary embodiment, the method is carried out for a bus system 50 which has a multiplicity of system components 1, 2 of which, however, only three are shown in FIG. 1. The remaining system components of the bus system 50 are indicated via three dots in FIG. 1. The bus system 50 shown in FIG. 1 is purely illustratively a CAN bus system of a motor vehicle which comprises a so-called CAN High Line 4 and a CAN Low Line 6 which are terminated at their ends in each case by a so-called terminating resistor 7 to avoid signal reflections at the line ends. In FIG. 1, the data packets N, S are shown schematically as document symbols which are sent out via the CAN lines 4, 6 which is shown by arrows on the CAN lines 4, 6 in FIG. 1.

In this first exemplary embodiment of the method, a first and a second system component 1, 2 communicate with one another via the CAN bus system 50, the first system component 1 transmitting a useful data packet N to the second system component 2. In this first exemplary embodiment, the first system component 1 is purely illustratively a control device of a motor vehicle whilst the second system component 2 is an actuator within the motor vehicle which is electrically conductively connected to the control device via the CAN bus system 50. However, the method can also be carried out for communication between any other system components which may also be connected to one another via completely different bus systems 50. Useful data packets N, which are transmitted from the control device to the actuator via the bus system 50 comprise purely illustratively operating data for the actuator in this first exemplary embodiment.

Both the first and the second system component 1, 2 have in each case a signing and signing test unit 10 by means of which data packets can be generated and tested. Optionally, both the first and the second system component 1, 2 can have in each case a signing unit and/or a verification unit. In other words, both system components 1, 2 provide in each case an encryption function and a decryption function by means of which data packets can be encrypted and decrypted or generated and tested, respectively. Furthermore an encryption function and a decryption function is provided in each case for both system components 1, 2, by means of which function data packets can be encrypted and decrypted. In a first operation of the disclosed method, the first system component 1, in this case purely illustratively the control device 1, generates an independent protective data packet S with protective information, which is also called so-called signature data, for a useful data packet N to be transmitted via the bus system 50, which protective data packet S is independent of this useful data packet N but, nevertheless, can be allocated unambiguously to it. In other words, the first system component 1, or the control device, respectively, generates a signature for the useful data packet N to be sent out via the bus system 50, that is to say the protective data packet S.

In a subsequent operation of the method, the generated protective data packet S is sent out separately from the associated useful data packet N via the bus system 50 to the second one of the system components 2, that is to say, purely illustratively in this first exemplary embodiment, to the actuator. Thus, the protective data packet S is not connected to the useful data packet N and can be sent out and received completely separately from the latter. The second system component 2, that is to say the actuator, receives the protective data packet S, whereupon the useful data packet N, to which the protective data packet S is allocated, is transmitted by the first system component 1 to the second system component 2 and in a third method operation, a verification of the authenticity of the useful data packet N being transmitted is effected by means of the transmitted protective data packet S by the second one of the system components 2. In this first exemplary embodiment, in the signing and signing test units 10 of the at least two system components 1, 2 a cryptographic key is deposited in each case by means of which the data packets sent out and to be protected are encrypted and decrypted or generated and tested, respectively. The second system component 2 thus decrypts data packets using the same cryptographic key by means of which the data packets were encrypted by the first system component 1. In other words, the second system component 2 decrypts the data packets with a cryptographic key which corresponds to the cryptographic key by means of which the data packets were encrypted by the first system component 1.

In this first exemplary embodiment of the method, each protective data packet S which is generated for a useful data packet N and sent out via the bus system 50 can be allocated unambiguously to its respective useful data packet N. This takes place in that each useful data packet N for which a protective data packet S is generated comprises a counter Z having a bit length of N bits, which counter is incremented with each transmission of the respective useful data packet N. In this exemplary embodiment, the protective data packet S also comprises purely illustratively the counter Z contained in the associated useful data packet N so that there is the unambiguous allocation via the counter Z which is identical in both data packets. In this first exemplary embodiment, the counter Z is also incremented by one with each sending out of the respective useful data packet N or protective data packet S, respectively, via the bus system 50. Since the protective data packet S is formed via the useful data packet N and the counter Z is also contained in the protective data packet S, the protective data packet S can be allocated directly and unambiguously to a useful data packet N via the count of the counter Z. In this first exemplary embodiment, the counter Z has purely illustratively a bit length of 4 bits. However, other counters having another bit length can also be used. Furthermore, disclosed methods can be carried out in which the counter Z is not mapped completely in the useful data packet N but is calculated in each case via the system components 1, 2 involved. Furthermore, the use of the counter Z also contributes to a replay protection against hacker attacks. In this first exemplary embodiment, the counter Z is reset to a value of 0 purely illustratively in the case of an overflow.

Furthermore, it is ensured in the disclosed method that a protective data packet S and the associated useful data packet N are also received by a receiving system component 1, 2 and the communication via the bus system 50 is thus operating robustly. Within the scope of the disclosed method, this is ensured by the fact that each protective data packet S and each useful data packet N has in each case one message identifier IDS, IDN, deciding about the allocation of the respective data packet S, N to a priority stage, wherein the value of the message identifier IDS of a protective data packet S is selected close to the value of the message identifier IDN of the useful data packet N which can be allocated to it, in such a manner that the useful data packet N and the protective data packet S which can be allocated are allocated to the same or directly mutually adjacent priority stages. In this first exemplary embodiment, the message identifiers IDS, IDN often also called object identifiers, of the so-called CAN-ID correspond to the signature, that is to say the CAN-ID of the protective data packet S or the CAN-ID, respectively, of the useful data packet N. The CAN-IDs form the message identifiers of the data packets S, N transmitted via the CAN bus system 50. The values of these two last-mentioned CAN-IDs are selected to be as close to one another in such a manner that the protective data packet S is allocated to the same priority stage as the useful data packet N or, alternatively, the protective data packet S and the useful data packet N are allocated to directly adjacent priority stages within the bus system.

In this first exemplary embodiment of the method, not all useful data packets N to be transmitted or transmittable via the bus system 50 are secured by generating and sending out a protective data packet S. Within the context of the disclosed method, useful data packets N can also be sent out via the bus system 50 for which packets no protective data packet S is generated and sent out and for which thus there is also no verification of their authenticity by means of a protective data packet S. In this context, it is specified via the message identifier IDN of a useful data packet N whether a protective data packet S is generated for the respective useful data packet N or not. Thus, protective data packets S are generated exclusively for useful data packets N with the particular message identifier IDN identical from useful data packet N to useful data packet N. If a protective data packet S is generated for a particular message identifier IDN, for example, for a message identifier IDN with a counter value of 5, a protective data packet S is always generated for all useful data packets N having this counter value. In contrast, it can be specified for useful data packets N having a different message identifier IDN deviating, for example, from the counter value 5 that no protective data packets S are generated for these useful data packets N. In this context, the message counter is meant here. Optionally, in a special variant of the embodiment of the method, a protective data packet is also sent out only for messages having the counter Z 2, 4, 6 etc.

In this first exemplary embodiment, all useful data packets N which can be transmitted via the bus system are graded into functional groups according to functional criteria. For each of the functional groups thus obtained it is specified whether protective data packets S are generated and transmitted for the useful data packets N contained in the group. The specification of the functional groups is predetermined purely illustratively in this first exemplary embodiment. In other exemplary embodiments of disclosed methods, however, it can also be designed to be performable individually by a user. With such an embodiment of the disclosed method, a user of the bus system 50 can decide in advance for which useful data packets N or for which functional group of useful data packets N, respectively, allocatable protective data packets S are generated. In this exemplary embodiment, a functional group comprises purely illustratively all useful data packets N which comprise information or data, respectively, for a route travelled within the system or for determining such a route, respectively. Another functional group comprises in this exemplary embodiment purely illustratively all useful data packets N which comprise information or data, respectively, relating to an autonomous trip of the motor vehicle. If the useful data packets N are generated and sent out from one of these aforementioned functional groups, a protective data packet S, which can be allocated in each case to the useful data packets N, is always also generated and sent out. The data are authenticated only within these functional groups via group keys. Furthermore, the useful data packets N can also be subdivided into non-functional groups in other embodiments of disclosed methods, which groups are formed by means of other criteria than those presented above.

In this first exemplary embodiment of the disclosed method, the communication between the system components 1, 2 is protected against a replay attack. Generally, this can take place within the context of the disclosed method, particularly by a so-called global time stamp or by the execution of a challenge-response method. In this first exemplary embodiment of the method, the two system components 1, 2 have in each case a time unit 8 synchronized to a common system time T. In this first exemplary embodiment of the disclosed method, the global system time T is taken into consideration in the formation of a protective data packet S. A more precise description of the formation of protective data packets S can be found in the description for FIGS. 3 and 4, still following.

Instead of the global time stamp, a challenge-response authentication can also be performed between the at least two system components 1, 2 within the context of other exemplary embodiments of disclosed methods. As part of this challenge-response authentication, a generated random number CH is exchanged between the two system components 1, 2, the response to which is used for the authentication. This random number CH is often also called challenge, request or nonce, that is to say number used only once.

Figure 2:
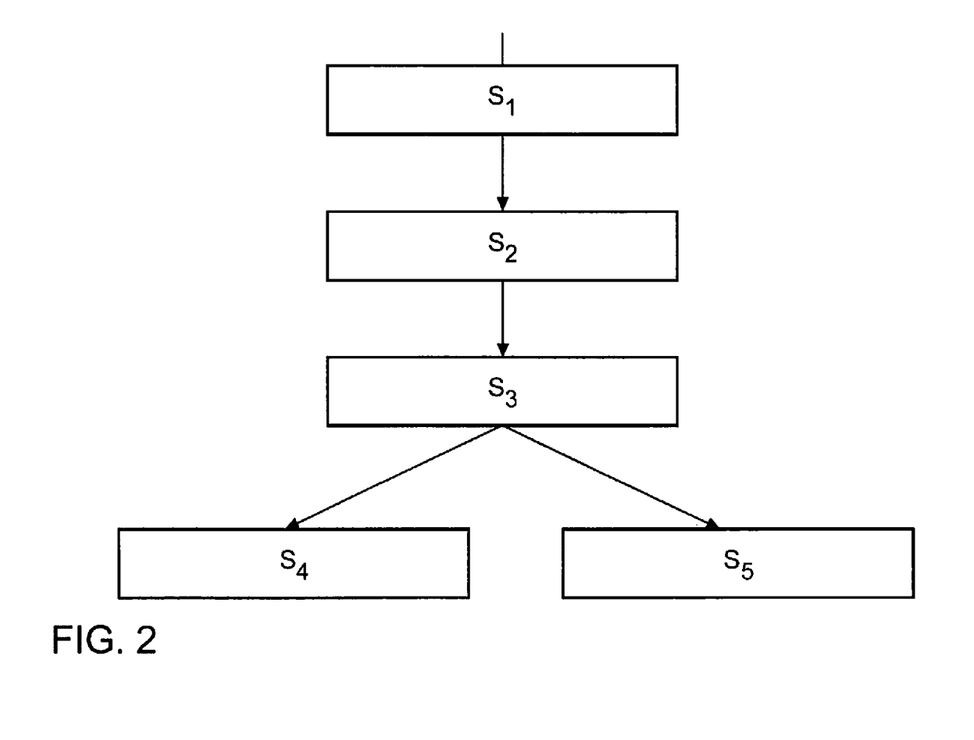
FIG. 2 shows a flow chart of a second exemplary embodiment of the disclosed method.

FIG. 2 shows a flowchart of a second exemplary embodiment of the disclosed method. In this exemplary embodiment, the flowchart comprises purely illustratively a total of three method operations S1 to S3 always to be carried out, and a method operation S4 or S5, respectively, to be carried out after a case distinction. In this context, the method is essentially identical to that described before. The method is again used as manipulation protection of useful data packets N to be transmitted between at least two system components 1, 2 via a bus system 50, the system components 1, 2 in each case comprising a signing and signing test unit 10 by means of which data packets can be generated and tested (see above and FIG. 1).

In a first operation S1 of the method, an independent protective data packet S having protective information for a useful data packet N to be transmitted via the bus system 50 is generated via a first one of the system components 1 as already described before, which protective data packet is independent of this useful data packet N but nevertheless can be allocated to it unambiguously. In a second operation S2 of the method, the generated protective data packet S is sent out to the second system component 2 via the bus system 50 separately from the associated useful data packet N. Following this, the useful data packet N to which the protective data packet S can be allocated is transmitted from the first system component 1 to the second system component 2. This can take place either as part of the second method operation S2 or as independent operation of the method (not shown in FIG. 2). In a third method operation S3, the authenticity of the useful data packet N being transmitted is verified by means of the transmitted protective data packet S by the second one of the system components 2. For this purpose, the protective data packet S is matched with the useful data packet N also received by this second system component 2.

At this stage of the method, a case distinction is performed in this second exemplary embodiment. If the verification of the useful data packet N by means of the protective data packet S shows in the third method operation S3 of the method that the useful data packet N, which can be allocated to the protective data packet S, is authentic, that is to say was actually sent out by the first system component 1 with authorization, the useful data packet N is accepted by the second system component 2 and, if applicable, executed. If the useful data packet N contains, for example, control data for an actuator, these are implemented or executed, respectively, in the fourth method operation S4 after successful verification. If, in contrast, the verification by means of the protective data packet S in the third method operation S3 of the method shows that the useful data packet N, which can be allocated to the protective data packet S, is not authentic, that is to say was not sent by the first system component 1, the useful data packet N is discarded by the second system component 2 and not further taken into consideration. If applicable, the control information contained in the respective useful data packet N is not implemented.

Figure 3:
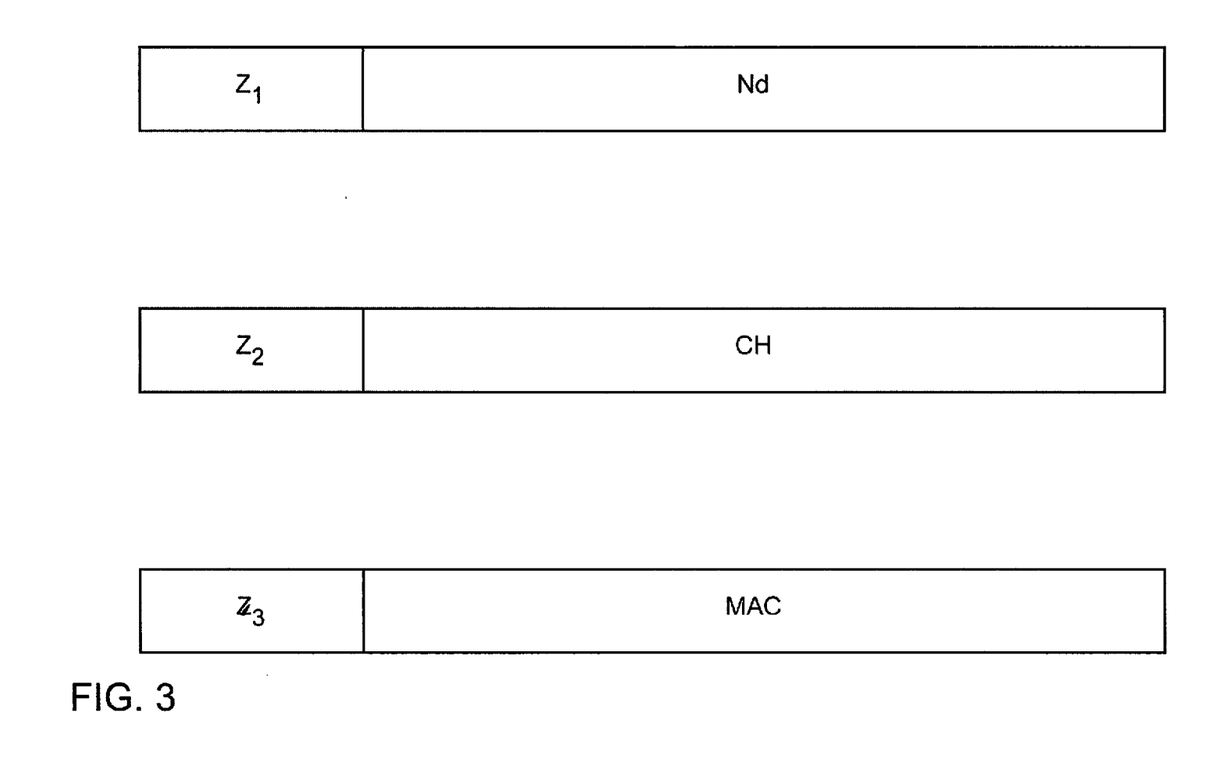
FIG. 3 shows a schematic representation of the message structures of data packets that can be generated and transmitted in the first or second exemplary embodiment of the disclosed method.

FIG. 3 shows a schematic representation of the message structures of data packets which can be generated and transmitted in the first or second exemplary embodiment, respectively, of the disclosed method. Expressed more precisely, three different message structures of data packets are represented in FIG. 3. The way in which a particular message structure of a particular data packet is configured depends on what type of data packet it is or which purpose is pursued with it, respectively. In general, each data packet comprises a counter Z which is used for the allocation between data packets and the replay protection. The useful data Nd, which are also called payload, are data to be protected and encrypted by means of the protective data packet S. In the exemplary embodiments previously described, the protective data packets S are encrypted purely illustratively via the calculation of a Message Authentication Code MAC. It is shown further below which of the aforementioned data or data packet components enter into the calculation of the Message Authentication Code MAC (see FIG. 4). It is the above-mentioned cryptographic key by means of which the data packets are encrypted by the first system component 1 and decrypted by means of the second system component 2, which is used for generating the Message Authentication Code MAC. Furthermore, other, separate cryptographic keys can also be deposited for the encryption.

The topmost message structure shown in FIG. 3 represents the message structure of a useful data packet N which can be transmitted via the bus system 50 and is composed of the useful data Nd, that is to say the payload, and the counter Z1. According to the disclosed method, the useful data packet N can be transmitted unchanged or only with slight changes, within the context of the method, from the first system component 1 to the second system component 2 of the bus system 50. If useful data packets N, which can be allocated to the ASIL, that is to say the Automotive Safety Integrity Level, are to be transmitted via the bus system 50, the counter Z1 of the useful data packet N corresponds to the so-called ASIL counter which is always provided in so-called ASIL messages or ASIL message packets. In the case of such useful data packets N, the same can be transmitted completely unchanged. If a challenge-response method is performed, the counter Z1 is predetermined by the one receiving the useful data of the system components 2. In other useful data packets N to be transmitted, or messages, respectively, the counter Z1 corresponds to a random number having a bit length of 4 bits. The useful data Nd can occupy a bit length of between 60 bits, for example, in the case of CAN messages, and 252 bits, for example, in the case of CAN-FD-messages. In principle, it may be the case in other bus systems 50 that other bit lengths, that is to say smaller or greater bit lengths, can also be occupied with useful data Nd. In this exemplary embodiment of the method, the counter Z1 always has a bit length of 4 bits.

The central message structure shown in FIG. 3 shows the message structure of a random number CH equipped with a counter Z2 which, during a challenge-response authentication performed as part of the execution of the disclosed method is sent from the first system component 1 to the second system component 2. This message structure, too, has a counter Z2 which, in the present exemplary embodiment, comprises 4 bits and 4 Null-bits. The random number CH itself can comprise purely illustratively 60 bits in this exemplary embodiment of the method. It is randomly generated newly for each useful data packet N to be transmitted.

The bottommost message structure shown in FIG. 3 corresponds to the message structure of a protective data packet S which also has a counter Z3. The counter Z3 of the protective data packet S has a bit length which, in the present exemplary embodiment, corresponds purely illustratively to the bytes value, that is to say the number of occupiable bytes of the useful data packet N which can be allocated to the protective data packet S. If the useful data packet N which can be allocated to the protective data packet S has, for example, a bit length of 64 bits, these 64 bits correspond to exactly 8 bytes which is why the counter Z3 of the protective data packet S has a bit length of 8 bits, 4 of these bits being executed as null bits purely illustratively in this exemplary embodiment and the four remaining bits being used as the actual counter. Expressed in other words, the counter Z3 of the protective data packet S has a bit length of X bits, X corresponding to the number of bytes of the useful data packet N which can be allocated to the protective data packet S, the counter Z1 of the useful data packet N also being taken into consideration. The essential subject matter of the protective data packet S is the Message Authentication Code MAC calculated for the useful data packet N to be protected, which, in the present exemplary embodiment, comprises purely illustratively 56 bits and the basis of calculation of which is described in the text that follows with respect to FIG. 4. Expressed in other words, the counter in this exemplary embodiment also has purely illustratively a bit length of 4 bits, the value of which is accepted for the counter of useful data packet N and protective data packet S.

Figure 4:
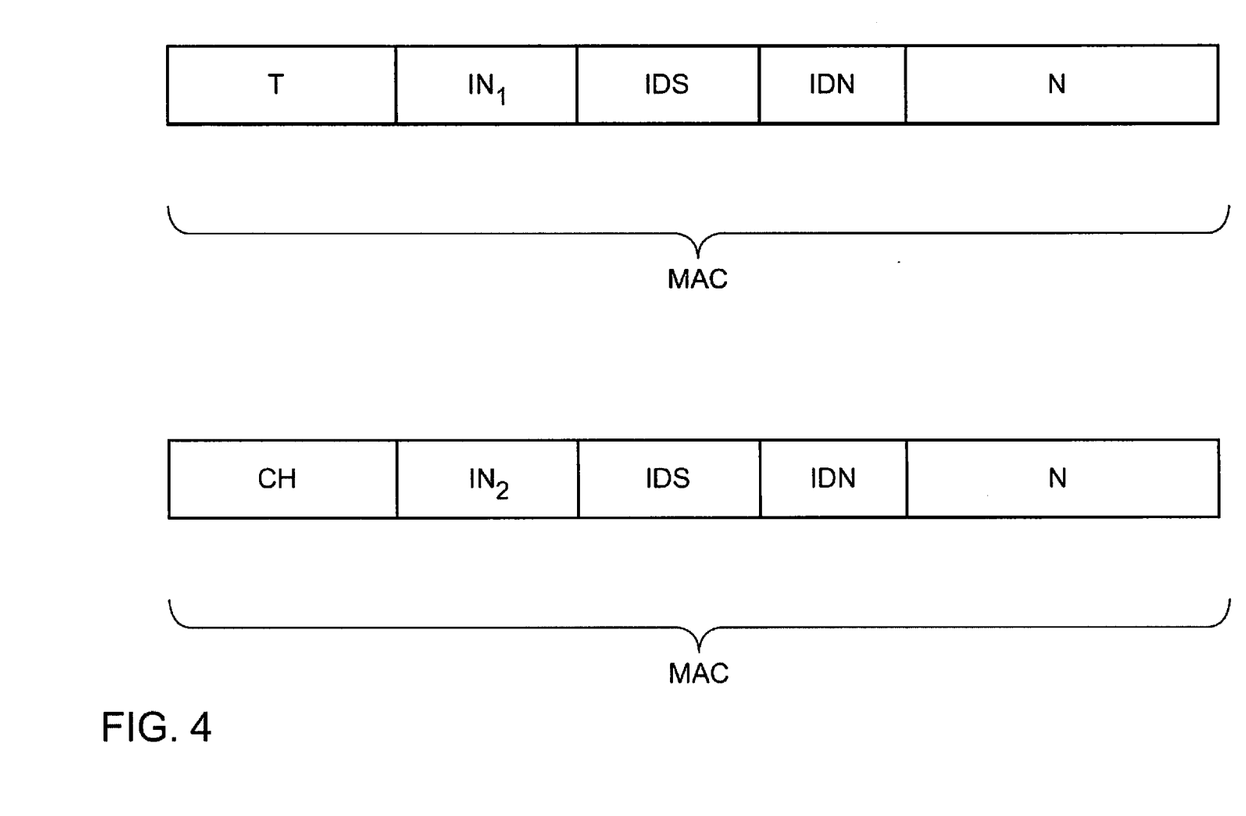
FIG. 4 shows two different bases of calculation of Message Authentication Codes for two different exemplary embodiments of the disclosed methods.

In FIG. 4, two different calculation bases of Message Authentication Codes MAC are shown for two different exemplary embodiments of disclosed methods. Expressed in other words, the diagrams shown in FIG. 4 are those data which are used for forming the protective data packets S as part of various exemplary embodiments of the disclosed method.

In this context, a distinction must be made between different possibilities for forming a protective data packet S. More precisely, two different calculation bases are obtained, particularly depending on whether a global time stamp is used for replay protection or the challenge-response method is performed (see above).

In some variants of embodiments of disclosed methods, a protective data packet S is formed via the system time T and via at least a part of the useful data Nd of the useful data packet N to be transmitted to which the protective data packet S can be allocated. This is the case when a global time stamp is used for replay protection. In other exemplary embodiments of disclosed methods, in which protection against replay attacks is implemented by carrying out a challenge-response authentication, a protective data packet S is formed via the generated random number CH and via at least a part of the useful data Nd of the useful data packet N to be transmitted to which the protective data packet S can be allocated. In the variants of the embodiments described before, protective data packets S are also formed via further data packet components, however. The top diagram in FIG. 4 shows all the data packet components via which the protective data packet S is formed in a variant of the embodiment of the disclosed method using a global time stamp. The Message Authentication Code MAC is here formed, purely illustratively, via the time stamp, that is to say via the system time T, via the bit length of the useful data |Nd|, via the message identifier IDS allocated to the protective data packet S, via the message identifier IDN of the useful data packet N to be protected and via at least a part of the useful data Nd of the useful data packet N itself to be protected. In this context, the system time T assumes a bit length of 7 bytes, the bit length of the useful data |Nd| assumes a bit length of 1 byte, the two message identifiers IDS and IDN assume a bit length of 4 bytes in each case and the useful data Nd taken into consideration assume a bit length of maximally 32 bytes so that a Message Authentication Code MAC is obtained purely illustratively from an input of a total of 48 bytes in this exemplary embodiment. The output of this calculation which is then sent as protective data packet S is much shorter, however. For example, the output of the MAC calculation can be a 128 bit CMAC which has been shortened to a bit length of 56 bits so that, together with the counter Z, it fits into a CAN message, the protective data packet S.

However, disclosed methods can also be carried out in which the protective data packet S is formed over fewer data packet components. For example, disclosed methods can be carried out in which the protective data packet S, purely illustratively, is formed exclusively via the system time T and via a part of the useful data Nd of the useful data packet N to be transmitted to which the protective data packet S can be allocated. However, it is also possible to generate and send out quite different protective data packets S than those described before.

The lower calculation base shown in FIG. 4 for the Message Authentication Code MAC is essentially identical to that shown above in FIG. 4. In distinction from the variant of the embodiment described before, it can be used in embodiments of disclosed methods in which, instead of a global time stamp, a challenge-response authentication is carried out. Accordingly, the only difference of the bottom calculation base shown in FIG. 4 from the top calculation base shown in FIG. 4 consists in that, instead of the time stamp, or of the system time T, respectively, the random number CH generated as part of the challenge-response authentication is used for calculation of the Message Authentication Code MAC. In this context, the random number CH also comprises purely illustratively a bit length of 7 bytes in this exemplary embodiment. The remaining message structure is identical to the one described before. The security level of the keys used for MAC calculation is 128 bits. Thus, a brute-force attack against the key is not possible.

A brute-force attack on the 56-bit MAC is possible theoretically, but cannot be applied in practice. Thus, the full exploitation of possible MACs would already take more than 100 000 years with a basic CAN-FD bus, for example, with 20 000 attempts/second and, for example, with a full utilization of the CAN-FD bus system amounting to approximately 2 Mbit/s. Even a 1% chance of success would already take more than 1000 years.

The disclosed method is also suitable for a communication between system components taking place via Ethernet. A hacker attack with 100 Mbit/s would here need more than 20 years for a successful manipulation with a 1% chance or more than 2 years with a 1% chance at a transmission rate of 1 Gbit/s. Furthermore, the disclosed method is particularly compatible with CAN bus systems or with CAN-FD bus systems, respectively. Additionally generated random numbers CH and MAC messages fit into normal CAN frames. MAC messages can be only optional as already stated above, that is to say the signing can take place as needed to reduce the loading on the bus system. Furthermore, there is a high backward compatibility to existing messages. The disclosed method can be executed for ASIL messages without adaptation of the useful messages since the associated counters Z are already in existence (see above). Other, not ASIL messages only need additionally 4 bits for the counter Z and no highly intrusive interventions in existing messages are required. Furthermore, the signed data can also be encrypted via an additional stream cipher. The initialization vector of the stream cipher used in this exemplary embodiment is purely illustratively at least a part of the time stamp comprising N bits or a part of the random number/challenge comprising the N bits and at least a part of a Message Authentication Code (MAC) comprising N bits, wherein N∈ℕ. Concretely, the 56-bit time stamp and the 56-bit MAC of the message are used as initialization vector of the stream cipher in this exemplary embodiment. In this context, the data must first be signed and then encrypted.

Furthermore, disclosed methods can be carried out in which the global time stamp, that is to say the system time T, is not also transmitted but is only implicit. In such an embodiment, the master of the bus system 50 transmits on request of at least one system component 1, 2 a time authenticated for its functional group. The system components 1, 2 then increment this independently. The master of the bus system 50 also places a non-authenticated time stamp on the CAN. This only serves as guide value for the system components for the detection of jitter. The initial time is generated as a random number by the master of the bus system with K1. 30. As frequency for the incrementation of the time stamp, 100 ms can be used or set, respectively, for example.

LIST OF REFERENCE DESIGNATIONS

1 first system component
2 second system component
4 CAN-High line
6 CAN-Low line
7 termination resistor
8 synchronized time unit
10 signing and signing test unit
50 bus system
CH random number
N useful data packet
Nd useful data
|Nd| length of the useful data
S protective data packet
T system time
Z counter
$Z_1$ counter of the useful data packet
$Z_2$ counter of a random number
$Z_3$ counter of the protective data packet

The invention claimed is:

1. A method for a manipulation protection of use data packets to be transmitted via a bus system between at least two system components, wherein the at least two system components each comprise a signing unit that generates data packets and a signing test unit that tests generated data packets, the method comprising:
   a first one of the system components generating an independent, protective data packet with protective information for a use data packet to be transmitted via the bus system, wherein the protective data packet is independent of the use data packet but is allocated unambiguously to the use data packet;
   subsequently, transmitting the generated protective data packet separately from the associated use data packet via the bus system from the first one of the system components to the second one of the system components, and
   transmitting a verification of authenticity of the use data packet from the second one of the system components in response to receipt of the transmitted protective data packet by the second one of the system components,
   wherein each protective data packet and each use data packet has, in each case, one message identifier indicating allocation of the respective data packet to a priority stage, wherein a value of the protective data packet message identifier is selected close to a value of the message identifier of the use data packet allocated to protective data packet, such that the use data packet and the allocated protective data packet are allocated to a same or directly mutually adjacent priority stages.

2. The method of claim 1, further comprising depositing at least one identical cryptographic key in the signing and signing test units of the at least two system components for use in encrypting and decrypting protective data packets.

3. The method of claim 1, wherein each use data packet for which a protective data packet is generated comprises a counter having a bit length of N bits, wherein the method further comprises incrementing the counter with each transmission of the respective use data packet.

4. The method of claim 3, wherein the protective data packet is also formed using the counter and using a message identifier of the use data packet to which the protective data packet can be allocated.

5. The method of claim 3, wherein the protective data packet is also formed using the counter and via a message identifier of the protective data packet.

6. The method of claim 3, wherein the counter has a bit length of 4 bits.

7. The method of claim 1, wherein the at least two system components have a time unit synchronized to a common system time.

8. The method of claim 7, wherein the protective data packet is formed using the common system time and using at least a part of the use data of the use data packet to be transmitted to which the protective data packet is allocated.

9. The method of claim 8, wherein the protective data packet is also formed using the counter and using the message identifier of the use data packet to which the protective data packet can be allocated.

10. The method of claim 8, wherein the protective data packet is also formed using a counter and using the message identifier of the protective data packet.

11. The method of claim 1, the method further comprising carrying out a challenge-response authentication between the at least two system components, wherein a generated random number is transmitted from one of the at least two system components to the other one of the at least two system components and the response to the transmitted random number is used for the authentication.

12. The method of claim 11, wherein the protective data packet is formed using the generated random number and using at least a part of the use data of the use data packet to be transmitted to which the protective data packet is allocated.

13. The method of claim 1, further comprising calculating a Message Authentication Code for a use data packet to be protected and transmitting the Message Authentication Code in the protective data packet allocated to the use data packet.

14. The method of claim 1, further comprising discarding use data packets that are not verifiable as authentic based on a protective data packet.

15. The method of claim 1, wherein the bus system is a CAN bus system.

16. The method of claim 1, wherein use data packets not to be verified by protective data packets are also transmitted between the at least two system components for which no protective data packets are transmitted.

17. A method for a manipulation protection of use data packets to be transmitted via a bus system between at least two system components, wherein the at least two system components each comprise a signing unit that generates data packets and a signing test unit that tests generated data packets, the method comprising:

a first one of the system components generating an independent, protective data packet with protective information for a use data packet to be transmitted via the bus system, wherein the protective data packet is independent of the use data packet but is allocated unambiguously to the use data packet;

subsequently, transmitting the generated protective data packet separately from the associated use data packet via the bus system from the first one of the system components to the second one of the system components, and transmitting a verification of authenticity of the use data packet from the second one of the system components in response to receipt of the transmitted protective data packet by the second one of the system components, wherein, via the same bus system, use data packets not to be verified by protective data packets are also transmitted between the at least two system components for which no protective data packets are generated and sent out.

18. A system for a manipulation protection of use data packets to be transmitted via a bus system between at least two system components, wherein the at least two system components each comprise a signing unit that generates data packets and a signing test unit that tests generated data packets, wherein a first one of the system components generates an independent, protective data packet with protective information for a use data packet to be transmitted via the bus system, wherein the protective data packet is independent of the use data packet but is allocated unambiguously to the use data packet, wherein, subsequently, the generated protective data packet is transmitted separately from the associated use data packet via the bus system from the first one of the system components to the second one of the system components, and wherein, a verification of authenticity of the use data packet is transmitted from the second one of the system components in response to receipt of the transmitted protective data packet by the second one of the system components, wherein each protective data packet and each use data packet has, in each case, one message identifier indicating allocation of the respective data packet to a priority stage, wherein a value of the protective data packet message identifier is selected close to a value of the message identifier of the use data packet allocated to protective data packet, such that the use data packet and the allocated protective data packet are allocated to a same or directly mutually adjacent priority stages.

19. The system of claim 18, wherein at least one identical cryptographic key is deposited in the signing and signing test units of the at least two system components for use in encrypting and decrypting protective data packets.

20. The system of claim 18, wherein each use data packet for which a protective data packet is generated comprises a counter having a bit length of N bits, wherein the method further comprises incrementing the counter with each transmission of the respective use data packet.

21. The system of claim 20, wherein the counter has a bit length of 4 bits.

22. The system of claim 20, wherein the protective data packet is also formed using the counter and using a message identifier of the use data packet to which the protective data packet can be allocated.

23. The system of claim 20, wherein the protective data packet is also formed using the counter and via a message identifier of the protective data packet.

24. The system of claim 18, wherein, via the same bus system, use data packets not to be verified by protective data packets are also transmitted between the at least two system components for which no protective data packets are generated and sent out.

25. The system of claim 18, wherein the at least two system components have a time unit synchronized to a common system time.

26. The system of 25, wherein the protective data packet is formed using the common system time and using at least a part of the use data of the use data packet to be transmitted to which the protective data packet is allocated.

27. The system of claim 26, wherein the protective data packet is also formed using the counter and using the message identifier of the use data packet to which the protective data packet can be allocated.

28. The system of claim 26, wherein the protective data packet is also formed using a counter and using the message identifier of the protective data packet.

29. The system of claim 18, wherein a challenge-response authentication is carried out between the at least two system components, wherein a generated random number is transmitted from one of the at least two system components to the other one of the at least two system components and the response to the transmitted random number is used for the authentication.

30. The system of claim 29, wherein the protective data packet is formed using the generated random number and using at least a part of the use data of the use data packet to be transmitted to which the protective data packet is allocated.

31. The system of claim 18, wherein a Message Authentication Code is calculated for a use data packet to be protected and transmitted in the protective data packet allocated to the use data packet.

32. The system of claim 18, wherein use data packets that are not verifiable as authentic based on a protective data packet are discarded.

33. The system of claim 18, wherein the bus system is a CAN bus system.

* * * * *